United States Patent
Halldorsson et al.

(10) Patent No.: US 6,227,667 B1
(45) Date of Patent: May 8, 2001

(54) APPARATUS FOR RECORDING THE RETINA REFLEX IMAGE AND FOR SUPERIMPOSING OF ADDITIONAL IMAGES IN THE EYE

(75) Inventors: Thorsteinn Halldorsson, Munich; Horst Schmidt-Bischoffshausen, Neubiberg; Heinrich Eberl, Probstried, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/230,996
(22) PCT Filed: Aug. 1, 1997
(86) PCT No.: PCT/EP97/04188
 § 371 Date: Oct. 12, 1999
 § 102(e) Date: Oct. 12, 1999
(87) PCT Pub. No.: WO98/05992
 PCT Pub. Date: Feb. 12, 1998

(30) Foreign Application Priority Data

Aug. 5, 1997 (DE) .............................................. 196 31 414

(51) Int. Cl.[7] ....................................................... A61B 3/14
(52) U.S. Cl. ............................................................. 351/206
(58) Field of Search ..................... 351/205, 206, 351/208, 209, 210, 211; 382/103, 128; 345/8; 359/630

(56) References Cited

U.S. PATENT DOCUMENTS

| | | |
|---|---|---|
| 4,213,678 | 7/1980 | Pomerantzeff et al. . |
| 4,758,080 | * 7/1988 | Howland ............................. 351/211 |
| 4,886,351 | 12/1989 | Sabban et al. . |
| 5,106,179 | 4/1992 | Kamaya et al. . |
| 5,177,511 | 1/1993 | Feuerstein et al. . |
| 5,467,104 | 11/1995 | Furness, III et al. . |
| 5,644,642 | * 7/1997 | Kirschbaum ......................... 382/103 |

FOREIGN PATENT DOCUMENTS

| | | |
|---|---|---|
| 3614153 | 1/1987 | (DE) . |
| 3607721 | 9/1987 | (DE) . |
| 0473343 B1 | 3/1992 | (EP) . |
| 0511154 A2 | 10/1992 | (EP) . |
| 0562742A1 | 9/1993 | (EP) . |
| 0722108 | 7/1996 | (EP) . |
| WO88/03396 | 5/1988 | (WO) . |
| WO90/09142 | 8/1990 | (WO) . |

OTHER PUBLICATIONS

"Confocal scanning laser ophthalmoscope", Robert H. Webb, et al. *Applied Optics*, Bd.26, No. 8, Apr. 15, 1987, pp. 1492–1499.

"Optical and retinal factors affecting visual resolution", Campbell, J. Physiol., Bd. 181, Ap. 27, 1965, Great Britain, pp. 576–593.

"Spectral reflectance of the human ocular fundus", Delori, Applied Optics, Bd. 28, No. 6, Mar. 15, 1989, NY, US., pp. 1061–1077.

"Flying spot TV ophthalmoscope", Webb. Bd. 19, No. 17, Sep. 1, 1980, pp. 2991–2997.

* cited by examiner

Primary Examiner—George Manuel
(74) Attorney, Agent, or Firm—W. F. Fasse; W. G. Fasse

(57) ABSTRACT

An apparatus for recording the exterior retina reflex image of the human eye, has a scanning recorder. The beams of the exterior images pass through the spectacle glasses constructed on the inner side as vaulted, imaging, beam splitting mirrors. The scanning recorder for recording and detouring the parallel beam bundles exiting from the eye after backscattering by each spot on the retina, is a biaxial scanner. An opto-electronic detector receives the light bundles from the biaxial scanner for serial recording of the retina reflex image.

23 Claims, 8 Drawing Sheets

APPARATUS FOR RECORDING THE RETINA REFLEX IMAGE AND FOR SUPERIMPOSING OF ADDITIONAL IMAGES IN THE EYE

FIELD OF THE INVENTION

The invention relates to an apparatus which makes it possible to record the back scatter of the exterior image projected onto the retina of the human eye. The backscatter or retina reflex image is modified or enhanced by additional information by an electronic image processing to form an enhanced image which is projected back into the eye with the aid of a laser beam modulation and deflection for superimposing on the original exterior image.

BACKGROUND INFORMATION

The technical requirements that must be met by the recording, processing and reproduction of images keep growing with an increasing demand for information and their clear graphic visualization. The rapid advance in these fields goes hand-in-hand with the ever accelerating image processing by computers.

Today, the main field where electronic image processing is applied, involves the further processing of images that are taken by cameras, scanning systems and sensors in the visible light spectrum as well as in other sections of the electromagnetic spectrum such as the infrared, the radio frequency and the X-ray frequency range. After electronic processing, the images are reproduced either as individual images or as moving images on an image reproduction screen such as a display for presenting the information to the eye.

On the one hand it is possible to make special image contents easier recognizable by electronic image processing. Known techniques for this purpose include, for example local frequency filtering, margin sharpness increasing, image data compression, image correlation, dynamic reductions and false color coding. On the other hand, other techniques are concerned with the superposition or subtraction of auxiliary images taken from different spectral ranges or with the superimposing of stored plans, maps, and drawings onto the original image.

For many applications an image presentation practically free of time lag is of great advantage to the eye, for example when operating an aircraft, ship, vehicle, or in an open loop control and monitoring of processes and assembly lines. By applying image processing the information content of the actual, direct image can be intentionally increased or reduced. Image processing is used in a wide range from increasing the image contrast to blending-in of additional information, marking of details, and highlighting dangers.

In many of these applications, it is disadvantageous that the electronic camera is a "second eye system" separate from the human eye. This disadvantage is due to the fact that the images are seen from another recording location and that additionally, the pictures on the image screen are presented at another observation location than the eye. Thus, the human eye must constantly change between the direct observation and the indirect observation while taking into account different observation angles, different image details, and different size ratios which leads to physical impairments and delays when decisions must be made.

The above problems have in part been solved by the "head-up-display (HUD)" technique used in the piloting of combat aircraft, in that important informations such as instrument displays and target data are inserted or fade-in into the open spectacles of the pilot's helmet and thus into the visual field of the pilot. This technique is also used experimentally in the automobile industry for displaying of instrument readings on the windshield so that the driver is not distracted from viewing the road by viewing the instrument panel.

The HUD technique has been further developed in the so-called "virtual reality" or "cyber space" technique, wherein closed spectacles are used, i.e. glasses in which the outside view is blocked, and three-dimensional full images moved by the HUD, are projected into the eye with virtual reality. These virtual reality images are then modified in response to body motions such as locomotion, movement of an arm, a finger, or head and eye movements.

The HUD technique generates an image on an image screen and projects the image into the eye after reflection on the surface of the spectacle glasses. The eye sees, so to speak, through the glasses as full mirrors onto the display "around the corner". Where open spectacles are used, a partially transmitting mirror permits the simultaneous viewing of the outside environment. Since the display is connected to the head, the image follows the head movements.

Certain HUD devices are equipped with an "eye tracker" which follows the eye movements with the help of a motion sensor applied to the eyeball or with a camera which observes the movements of the eye pupils or of the vascular structure of the retina. It is thus possible to electronically shift the image projected in the HUD device, corresponding to the these movements within the visual field.

It is possible in a HUD device to project the image through the projection optic into "infinity" in order to relax the eye free of accommodation. By adjusting different view angles for both eyes toward the same object, a stereoscopic, i.e. three-dimensional vision, is possible.

On the one hand these applications and techniques illustrate the high level of the electronic image processing which is capable to process moving images with an acceptable quality almost without time lag and with a reasonable technical effort and expense. On the other hand, these techniques also illustrate the increasing demand for a direct image transmission into the eye.

However, there are limits to current HUD techniques. The accuracy or precision of the automatic tracking of the eye movements with the eye tracker is substantially worse than the alignment precision and image resolution of the eye. As a result, the fade-in image floats or dances in the visual field which leads to an unprecise target acquisition and is tiring to the eyes.

For the above reasons, conventional applications of the full image reproduction are limited to the use of closed spectacles, i.e. to the exclusive fade-in of external images. Contrary thereto, when open spectacles are used, permitting an additional external view, the fade-in is still limited to simple additional information in the form of text, symbols, or image contours.

A complete three-dimensional and timely overlap between fade-in images and the real image seen by the eye requires an exact three-dimensional and timely coincidence of the two images on the retina. It is the aim of the invention to achieve this coincidence by a direct recording or photographing of the retina image and then projecting the new image back onto the real image substantially without any time lag and with congruence.

First, the prior art will be discussed as far as it relates to the recording of retina reflex images, to image scanning in the internal eye and the projection of laser images directly into the eye. The invention starts from this prior art.

The technical realization of a continuous imaging of the retina reflex of the environment or exterior requires that the optical reflex of the retina is actually usable. The reflection capability of the retina has been measured in detail, for example by F. C. Delori and K. P. Pflibsen in an article entitled "Spectral Reflectance of the Human Ocular Fundus" which appeared in "Applied Optics", Vol. 28, No. 6, 1989. The reflection capability of the fovea centralis of the retina has a low value of 0.2% at the blue visual spectral range (450 nm) and increases monotonously to a value of 10% at the long wave red range (750 nm). In the range of the largest eye sensitivity and the most acute vision, namely in the green/yellow range between 500 nm and 600 nm the reflection capability is within 1 and 2%.

Thus, a recording system for this reflection capability must be constructed for an illumination density of the retina that is smaller by a factor of 50 to 100 compared to the illumination density of the objects seen by the eye. A further impairment of the available light quantity is due to the size of the eye pupil of 1 to 7 mm, which is, compared to conventional technical recording systems such as photographic and video cameras, relatively small. The recording of the light reflected by the retina thus requires, due to these two reasons, an especially sensitive light sensor.

It is known that a structured reflex image is generated in the area of the fovea centralis of the retina when an image is formed in the eye. This phenomenon is described, for example, by F. W. Campbell and D. G. Green in an article entitled "Optical and Retinal Factors Affecting Visual Resolution", published in the Journal of Physiology, No. 181, page 576 to 593, (1965). Campbell and Green projected a brightly lit extensive grid structure onto the retina and the image reflected by the eye was deflected with a beam splitter mirror out of the beam path and imaged with a sharp focus outside of the eye on an image plane (screen). The surface imaging of the grid structure was used after its reflection by the retina, that is after passing twice through the eye, served for the determination of the modulation transfer function of the eye. The photometric evaluation showed that the quality of the reflex image came very close to the image quality seen by the eye.

The closed, static recording device used by Campbell employed an extremely high image illumination by photoflash with the eye in a fixed position. Such a device is not suitable for recording weakly illuminated dynamic exterior images on the retina while the rapid natural eye movements take place. For this purpose light sensitive rapid sensors are required together with a recording technique which sufficiently suppresses extraneous light in the open beam path and which is also capable of recording images at least with the repetition frequency of costumary video standards.

CCD cameras which record all image dots in parallel with a fixed integration time and serially scanning image recording systems with individual detectors (photodiodes or photomultipliers) are suitable for these purposes. Serial scanning involves sensing the image dots in time, one after the other. Both of these techniques are adapted to customary video standards.

A basic advantage of using the CCD recording technique is the long integration time in each image dot or pixel of, for example 20 ms compared to the short residence time in each pixel of only 40 ns during scanning. However, the serial recording technique has a number of other advantages in connection with the recording of very weak, rapidly changing light signals against a strong background noise as compared to the parallel recording technique. These other advantages make up for the short integration time.

These other advantages are:
a serial signal processing which makes possible a direct analog further processing of the image in real time;
an efficient suppression of scattered light by the small momentary visual field during scanning;
a high preamplification with low background noise by the employed avalanche photodiodes and photomultipliers;
a high signal dynamic which enhances the large variations of the picture brightness on the retina;
an efficient analog background noise suppression, for example by the phase-lock-in detection or by signal correlation; and
a simple correction of imaging or recording errors.

With regard to the object of the invention, the critical advantage of a serial image scanning is the further possibility to combine such image scanning with a time lag, synchronous, serial laser image projection into the eye.

Due to these advantages of the serial scanning, as compared to film and video recordings, the serial scanning is used since the early fifties (1950), primarily for the recording of microscope images. Three recording methods can be applied with a serial scanning. A first "flying-spot" recording is achieved by an area illumination of the object and a spot-type or pixel-type scanning with a photosensor (photoreceiver). The second method also referred to as "flying-spot" involves scanning the object with a point light source and surface area pick-up with a photosensor. The third method referred to as "confocal scanning" involves a spot illumination and a simultaneous spot pick-up with a photosensor. The same scanning device can be used for spot illumination and spot pick-up.

In practicing the first two methods, either the light source or the sensor is rigidly mounted, whereby either the sensor or the source is movable on the object. In the third method the light source and the receiver (sensor) are together depicted (confocally) on the spot to be scanned. In this confocal method the light source and receiver are held in a fixed position relative to each other.

In order to highlight the novel merits of the invention and its technical embodiments, the current status of the applications of image recordings and laser projections into the eye will now be explained in more detail.

U.S. Pat. 4,213,678 (O. Pomerntzeff and R. H. Web) (September 1980) discloses for the first time the second type of the "flying-spot" recording technique with the aid of a scanned laser beam used as an illumination source and a rigid large area photomultiplier used as a sensor or receiver for the pick-up or recording of the inner structure of the eye. These components are part of a scanning ophthalmoscope for examining the fundus of the eye.

An article by R. H. Web, G. W. Hughes, and F. C. Delori entitled "Confocal Scanning Laser Ophthalmoscope", published in "Applied Optics", Vol. 26, No. 8, pages 1492 to 1499 (1987), describes a further development of the above technique to a confocal arrangement with the simultaneous scanning of the laser beam and the receiver axis of the photomultiplier.

In the apparatus of Web, Hughes, and Delore, the retina is scanned by a laser beam in a raster pattern. The laser beam illuminates the object pixel-by-pixel (dot-by-dot) and line-by-line. The photosensor (photomultiplier) measures the respective reflected light and transforms the measured value sequence into a video signal. A television monitor presents the video signal eventually as an image. These three operation steps take place in exact synchronism. While the laser beam scans line-for-line the eye background, the television signal is simultaneously assembled.

The laser beam passes first through a modulator by which the illumination intensity can be controlled in an open loop manner. The horizontal line deflection is generally performed by a rapidly rotating polygonal mirror while the vertical deflection is performed by a swinging mirror. The pivot point of the scanning motion is located in the pupil plane of the eye. The light reflected by the eye background or rather scattered by the eye background is collected over the entire pupil opening and supplied to the photoreceiver or sensor through an imaging optic. In this manner the beam deflection is again cancelled and a stationary light or beam bundle is obtained which is imaged or recorded on a small detector surface.

Web, Hughes, and Delori recognized in the above mentioned article the possibility of using a confocal imaging in an ophthalmoscope for projecting artificial images with the aid of a laser projection into the eye. This possibility was described as follows: "The laser beam is deflected by a fast (15-kHZ) horizontal scanner and a slow (60-Hz) vertical scanner to project a standard format TV raster on the retina. Modulation of the beam permits projection of graphics or even gray scale pictures in the raster. While the patient is seeing the TV picture projected on his/her retina, an image of the retina is displayed on a TV monitor."

The direct projection of modulated light stimuli and patterns is used in modern laser scan ophthalmoscopes as, for example, are manufactured by the firm "Rodenstock" of Munich. These ophthalmoscopes are primarily used for line of sight analysis, video line of sight determinations, and contrast sensitivity measurements, whereby respectively only one laser wavelength is used.

Further proposals for the direct image transmission into the eye by lasers are known from the following two publications.

European Patent Publication 0,473,343 B1 of Nov. 19, 1995 (Sony Corporation) discloses a "direct viewing picture image display apparatus". This direct viewing display apparatus employs substantially only the known technical solutions as described above involving confocal imaging. These confocal imaging techniques have been realized in laser scanning ophthalmoscopes that are produced, for example by the firm of Rodenstock Instruments of Munich and such ophthalmoscopes are on the market.

The technical solution for expanding the image transmission of but one color out of three colors, is described in claims 10 and 11 of European Patent Publication 0,473,343 B1. Such a technique has also been used in other laser displays for many years. The shifting of the depth position of the images on the retina as described in claims 12 to 16 of said patent has been applied in the form of similar measures in existing equipment.

The separation of two beams by distinguishing polarizations as described in claims 16 to 19 and shown in FIG. 6 of the above mentioned Sony Patent, in order to project the same image into both eyes, is basically unsuitable for a "true" three-dimensional image presentation, because these images do not have any perspective differences. Further, said method does not permit any dynamic nor any individual adaptation to the eye alignment and thus it is difficult to realize this teaching in practice.

European Patent Publication 0,562,742 A1 (Motorola, Inc.), published in August, 1993, describes a direct view image display (apparatus) referred to as "direct retinal scan display" which involves the direct image transmission onto the retina as in the above described patent to Sony, however, with the difference the projection is accomplished by deflection through spectacles worn by a person.

The Motorola disclosure does not add new solution proposals to the existing prior art. The direct mounting of the entire display on the head of the user as defined in claim 4 or the deflection of the beam path of the projector through spectacles as defined in claim 5, has been realized in so-called "virtual reality" spectacles or in pilot helmets equipped with a "head-up display".

It is necessary to satisfy different optical requirements that must be met by the laser beam deflection in order to successfully project an image onto the retina. Such laser beam deflection requires, in addition to the special construction of the beam guiding elements following the beam deflection, a special spectacle glass vaulting. The Motorola disclosure does not address solutions of these basic optical problems.

SUMMARY OF THE INVENTION

The invention suggests a serially operating recording and projecting apparatus which makes it possible to record the images produced on the retina of the human eye when naturally viewing the environment (or exterior) and to modify or enhance these recorded images by an electronic image processing. The enhanced image is then projected back into the eye by a laser beam projector for synchronous superposition onto the original image, (referred to as retina reflex image). According to the invention all three basic colors red, green and blue are detected for the recording and projected back onto the retina.

The present object is basically different from a confocal laser scanning ophthalmoscope in which the retina is illuminated and imaged in the same scanning operation, because in the apparatus according to the invention the area-type retina reflex image of the exterior is scanned in a first scanning cycle in accordance with the "flying-spot" method and in a second timely separated scanning cycle the enhanced laser image is projected onto the retina. In the third or next following scanning cycle the retina reflex image is again recorded and in a fourth cycle the enhanced laser image is projected onto the retina and so on. Since these cycles change rapidly, a continuous sequence is generated in the eye as when watching television or a movie. In this continuous sequence the enhanced laser image follows synchronously and congruently the original image independently of any eye movements.

The invention distinguishes itself from all prior art known to the applicant relating to the direct laser projection into the eye and from the projection of extraneous images into a closed cyberspace spectacle. The invention also distinguishes itself from the projection of additional images into an open HUD spectacle. The distinguishing features are the direct coupling of the projection with the instantaneous exterior image content and the new technical embodiments for realism of such coupling.

The recording and image processing of the retina reflex image has become possible due to the rapid advance in the recording and processing technique of weak optical signals. The irradiation intensity to which the retina is exposed in a natural environment ranges from a very bright external illumination of $10^{-4}$ W $cm^{-2}$ to about $10^{-7}$ W $cm^{-2}$. In a room the illumination intensity generated by a weak interior lighting is within the range of $10^{-5}$ W $cm^{-2}$ to $10^{-6}$ W $cm^{-2}$, see for example an article entitled "Safety With Lasers and Other Optical Sources" by D. Sliney and M. Wolbarsht, (1980). According to R. H. Web et al. in an article "Flying-Spot TV Ophthalmoscope" as published in "Applied Optics", Vol. 19, No. 17, pages 299 and following, (1980), a sensitivity of $2\times10^{-5}$ W cm$^{-2}$ has been achieved with a photon counting photomultiplier and spot scanning with lasers in accordance with a television standard while taking into account a signal to noise ratio of 5.

An increase in the sensitivity to $10^{-7}$ W cm$^{-2}$ can, for example, be achieved by an improved noise suppression or a decreased local resolution or by the use of a spiral scan instead of a TV raster scan. A raster scan offers a reduced scanning speed in the center of the visual field and thus an increased time for integration in the image center.

According to the invention the surface area retina reflex image of the exterior picture is picked-up by a scanning photosensor. Thus, the invention uses a flying-spot-type image recording technique of the above mentioned first kind. A time-lag synchronous laser image projection with the aid of the same scanning device can be considered as a confocal technique in the sense of the common spot scanning projection of the light source and the photosensor onto the retina. However, a confocal scanning recording technique is not involved because the function of the photosensor and the function of the laser are exchanged relative to one another compared to their conventional use. According to the invention the time lag received signals serve for a time lag modulation of the laser source. Contrary thereto in the conventional method the laser source serves for illuminating while light signals are simultaneously received.

BRIEF DESCRIPTION OF THE DRAWINGS

The invention will be described in the following specification with reference to example embodiments, wherein the Figures supplement the description.

DETAILED DESCRIPTION OF PREFERRED EXAMPLE EMBODIMENTS AND OF THE BEST MODE OF THE INVENTION

Figure 1:
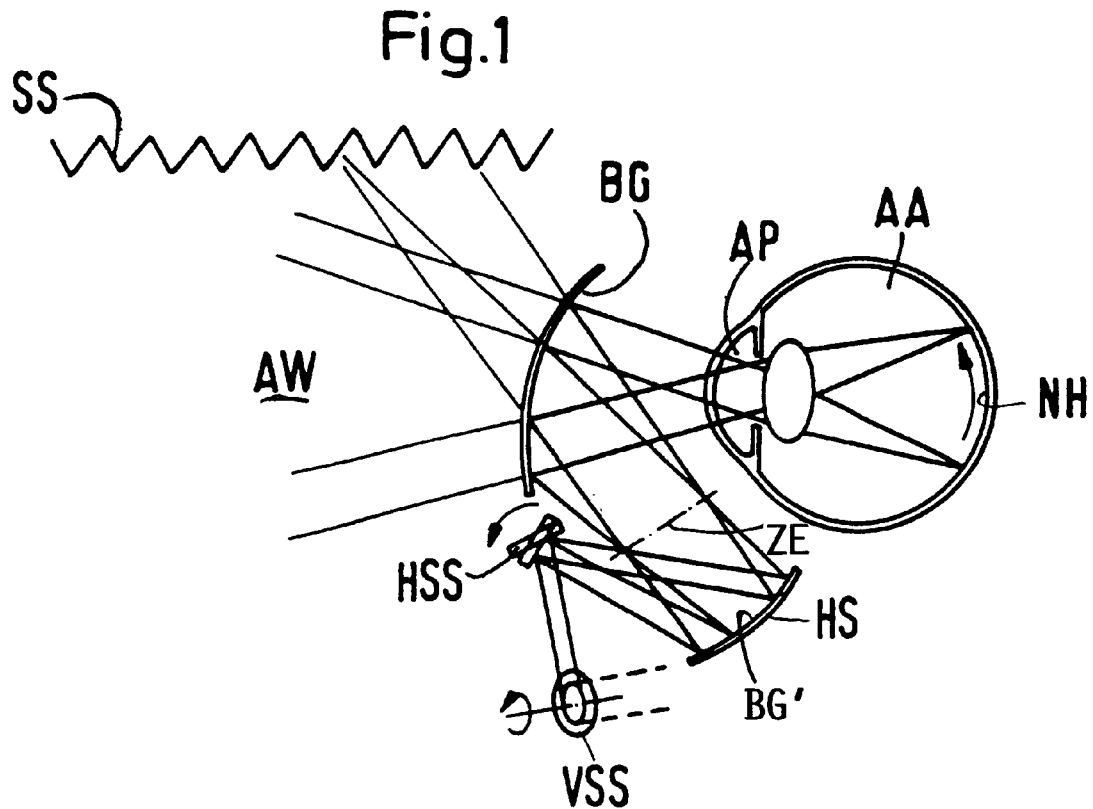
FIG. 1 is a schematic diagram of an example embodiment of the recording and projecting apparatus (into the eye) according to present claims 1 to 5 illustrating an embodiment wherein the imaging between the scanner and the eye is performed by two concave reflecting surfaces of an auxiliary mirror HS and through the inner surface of the spectacles BG.
Figure 2:
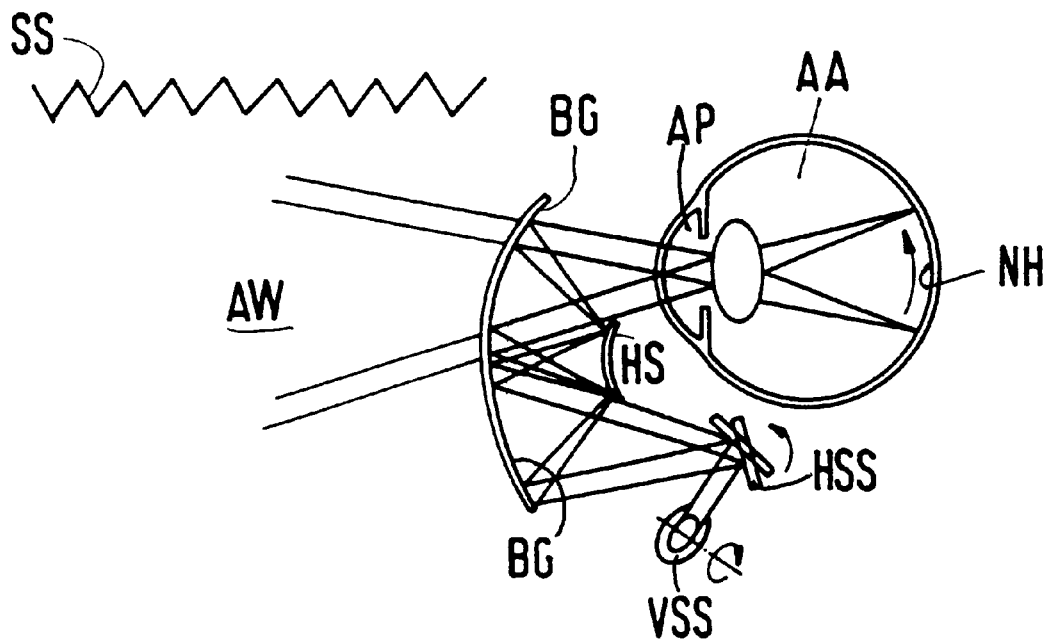
FIG. 2 shows a schematic block diagram of an example embodiment of the recording and projecting apparatus (into the eye) according to present claims 1 to 4 and 6, illustrating an embodiment wherein the imaging between the scanner and the eye is performed on the concave auxiliary mirror surface BG' of an otherwise convex auxiliary mirror HS and the concave inner surface of the spectacle glasses BG.
Figure 3:
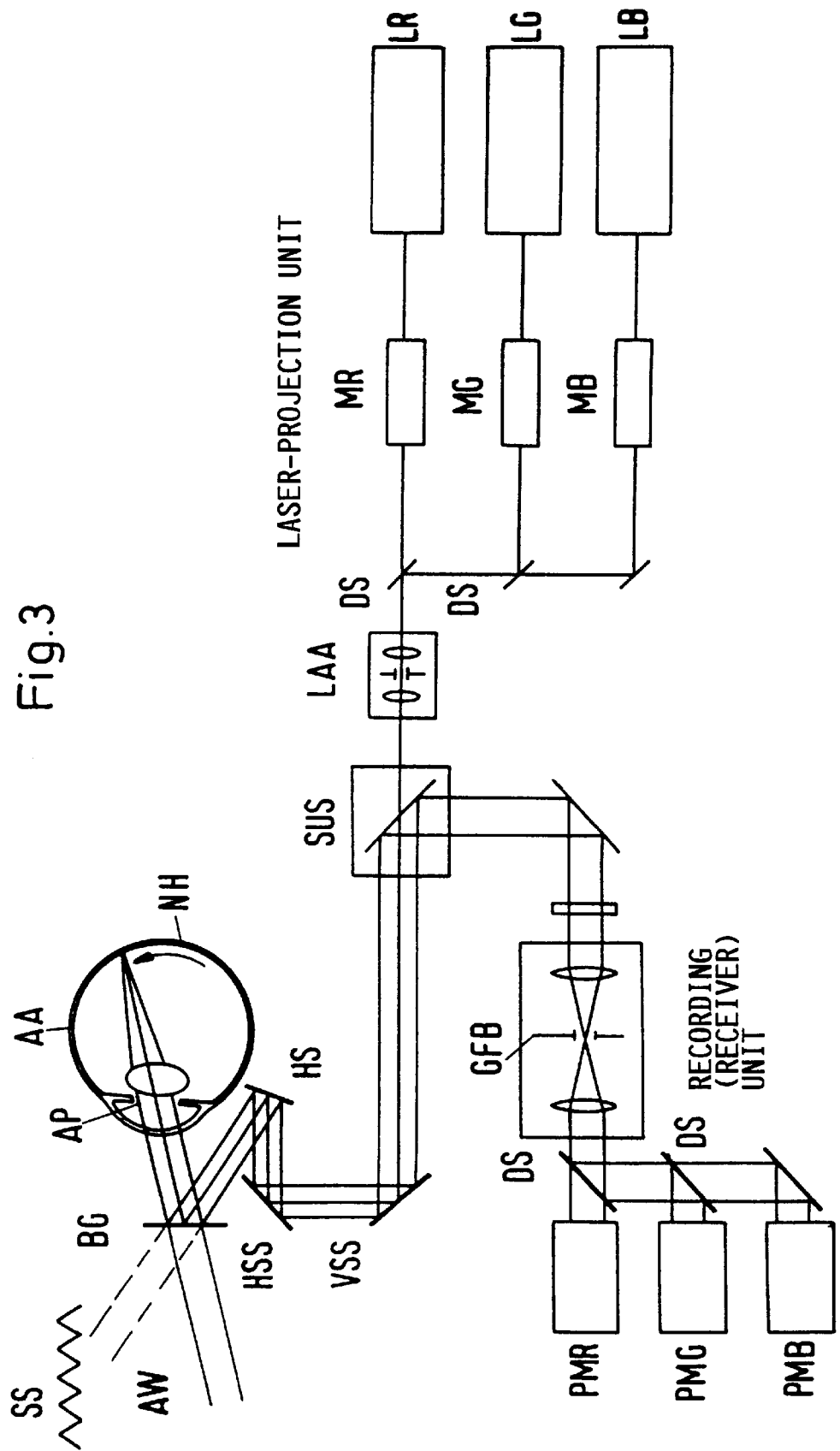
FIG. 3 is a block diagram of an example embodiment of the rigid beam path between the recording apparatus and the projecting apparatus with photosensors (receivers) and laser modulators according to claim 14.

The invention suggests according to claim 1, a scanning recording apparatus for the serial recording of the low luminosity retina reflex image of external AW objects on the retina NH of the eye AA as shown in FIGS. 1 to 3.

The same recording and scanning apparatus is also used for projecting the processed image with the aid of lasers and image modulators on the same, but opposite light path onto the retina according to claim 2 as also shown in FIGS. 1 to 3.

Figure 4:
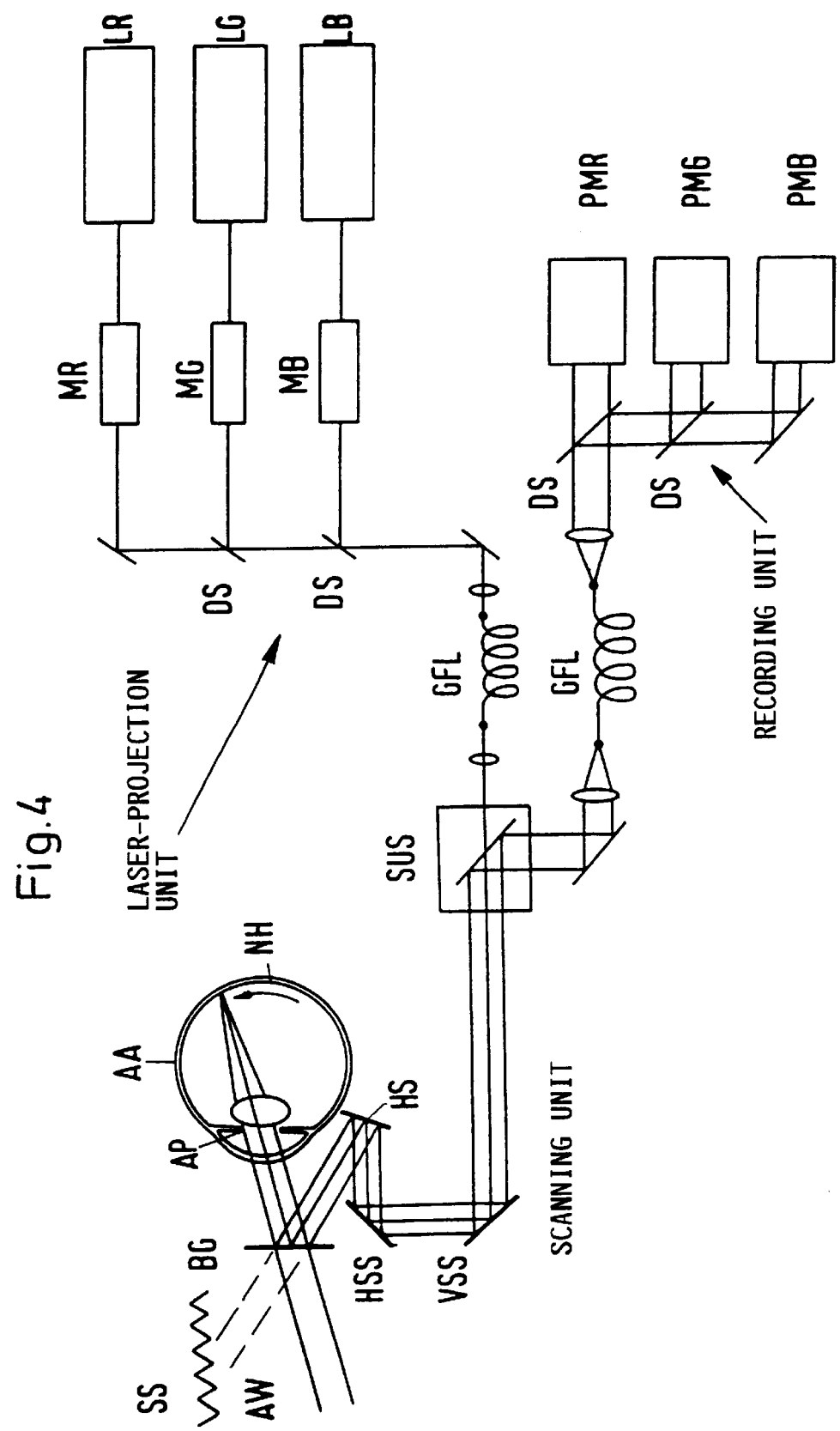
FIG. 4 is a block diagram of an example embodiment with a flexible coupling of the recording and projecting apparatus to a beam switch and scanning unit by means of flexible glass fibers according to claim 15.
Figure 5:
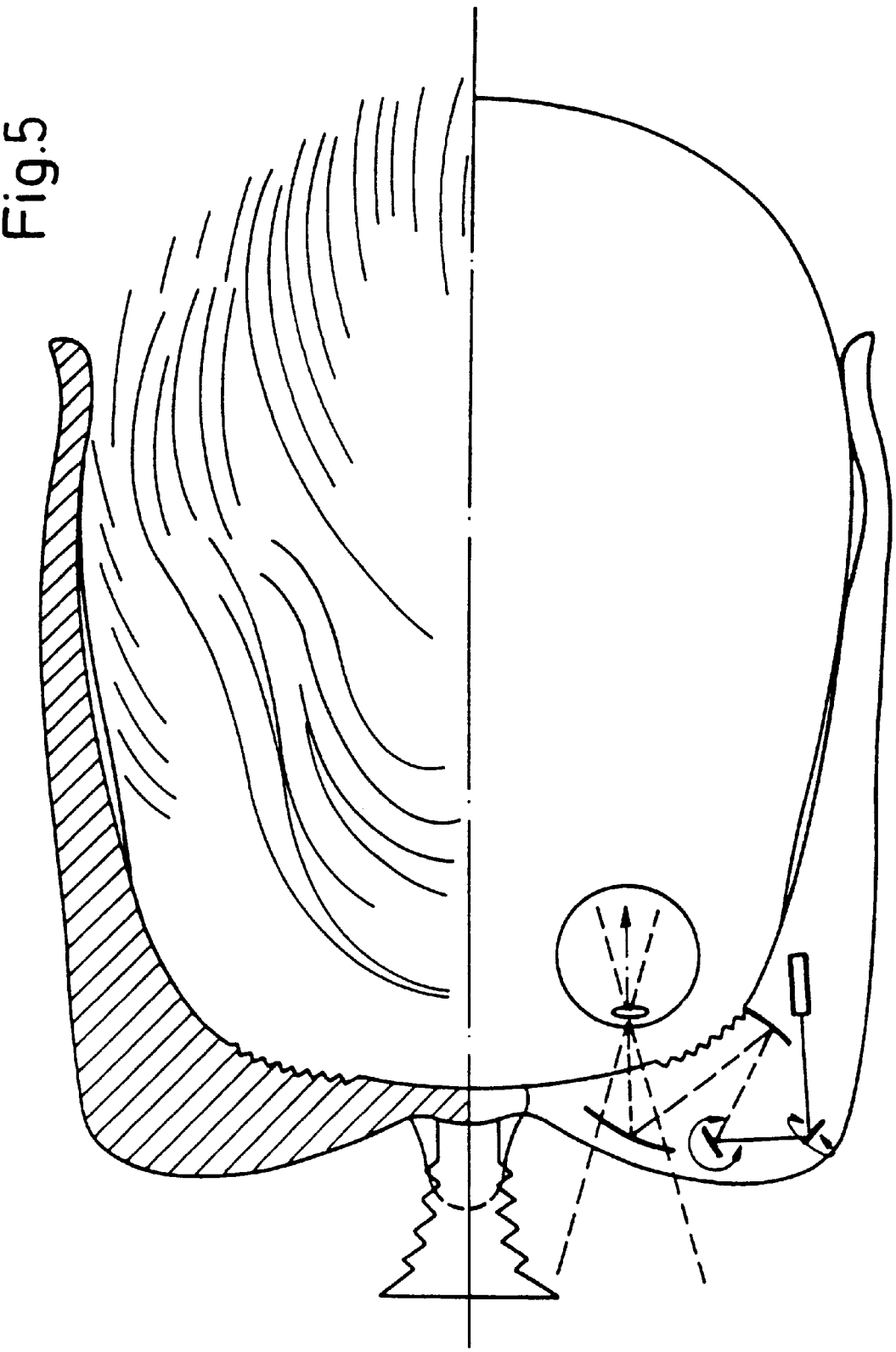
FIG. 5 is a schematic illustration of an embodiment in which the recording and projecting apparatus for both eyes is housed in a spectacle frame.
Figure 6:
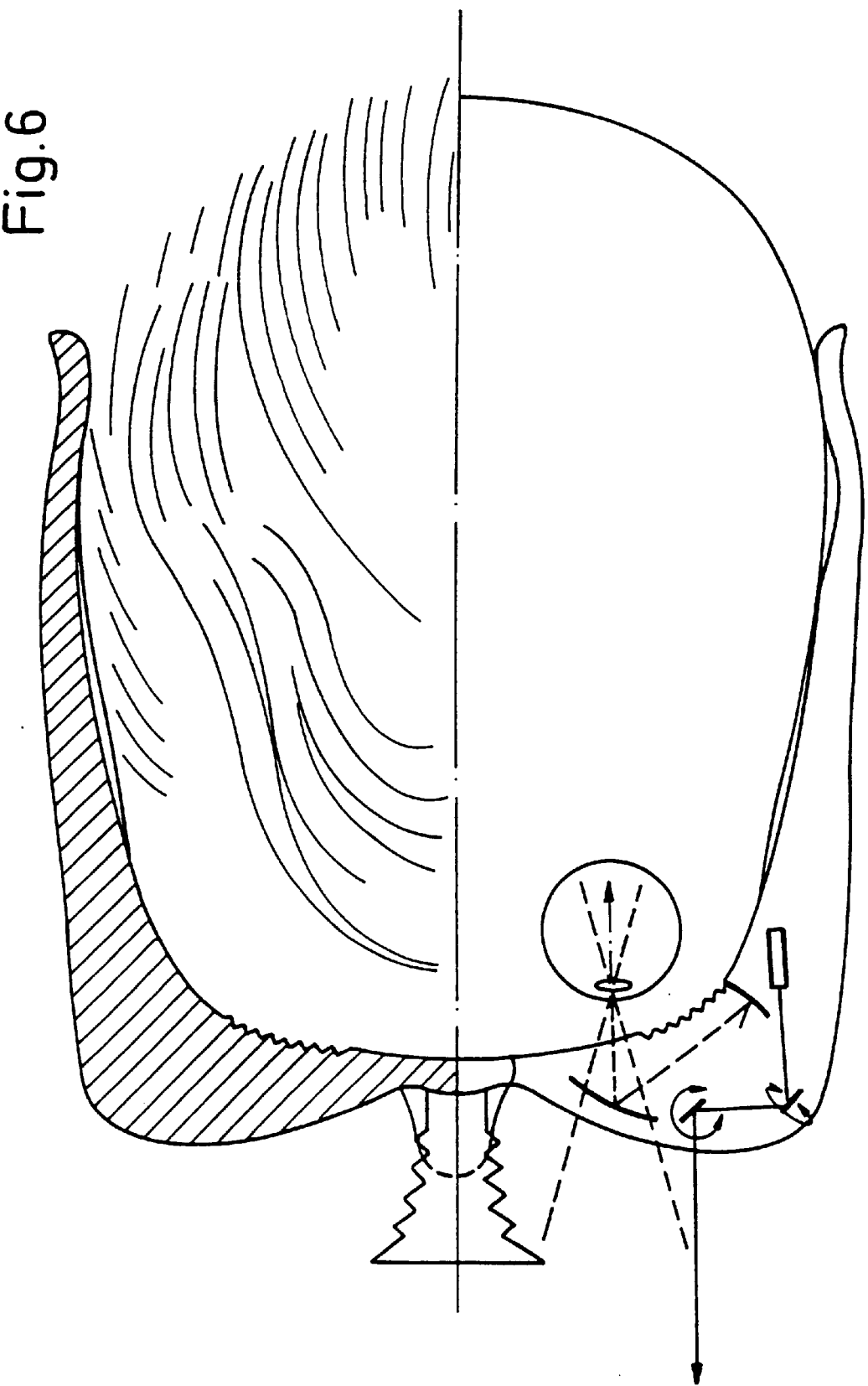
FIG. 6 shows schematically an embodiment of the beam path in the scanner when recording the retina reflex image and subsequently projecting the processed image onto exterior objects by switching the horizontal scanning mirror by an angle of 90° according to claim 23.
Figure 9:
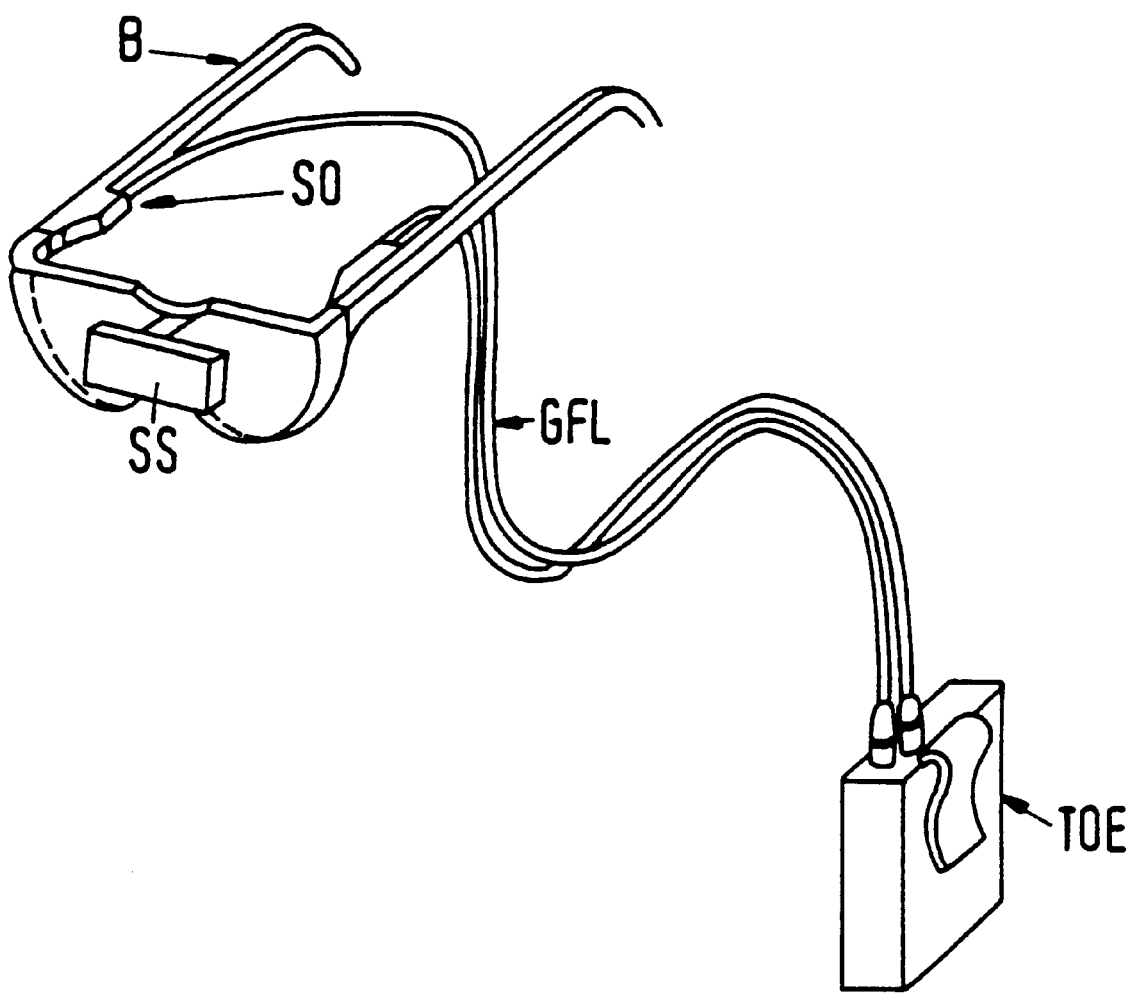
FIG. 9 illustrates schematically the microconstruction of the scanner integrated into a spectacle frame coupled through glass fibers to a portable recording and projecting unit and provided with a wireless transmission to an image processing computer.

The central feature of the invention is a special spectacles carried by an observer as shown in FIGS. 5, 6 and 9. The glasses of the spectacles BG serve as transmission elements for outside light and as an imaging surface for the reflex image from the retina as backscattered through the eye. The reflex image or backscattered light is transmitted through further imaging elements and a biaxial scanner HSS for the horizontal deflection and a biaxial scanner VSS for the vertical deflection, to a photosenor or receiver (FIGS. 1 to 4).

The beam path is simultaneously constructed in such a way that the extension of the side line from the detector through the spectacles always ends up in the absorbing layer of a radiation sink SS. The extension of the sight line of the eye through the glasses, however, extends to the exterior AW (FIGS. 1 to 6).

The simplest method of beam splitting at the glasses BG of the spectacles involves the use of mirror glasses that are 50% transmitting and 50% reflecting. However, it is also possible to use active electronically controllable mirrors which switch over from a complete transmission to a complete reflection in both scanning cycles.

The eye AA images on the retina parallel or almost parallel beam bundles of the exterior AW. The pivot point of the beam bundles for different view angles to the environment is located in the pupil AP of the eye AA.

The invention uses a simultaneous recording in both eyes and a projection into both eyes as shown in FIGS. 5 and 6. The invention is further uses a substantially identical beam path for the left and right eye. In case the user has ametropia including different powers of refraction in the left and right eye, the invention provides that either the spectacle glasses give the respective refraction correction by different vaultings (or curvatures) of the outer side and the inner side of the glasses for the individual adaptation or that the user wears contact lenses. For users with normal vision, the vaulting (or curvature) of the inner surface and of the outer surface of the spectacle glasses BG are identical to each other.

In the same way, the light backscattered by each individual pixel (image point) of the retina out of the eye is a substantially parallel beam bundle which passes along the identical path as the incoming light, however in the opposite direction onto the inner side of the partially reflecting glasses BG of the spectacle. The curvature or vaulting of this surface is so formed that together with the eye lens a second image of the retina pixel is generated in the intermediate plane ZE as seen in FIG. 1. An auxiliary mirror HS collimates the beams again and images these beams so that the collimated beams pass through the common pivot point on the axis of the horizontal scanning mirror HSS (as on the other side through the eye pupil). A vertical deflection is performed by a second scanner mirror VSS.

The imaging out of one eye into one eye with the aid of the two scanning mirrors, with the auxiliary mirror and with the glass mirrors of the spectacles while simultaneously providing a free exterior vision through the glasses BG requires a relatively strong beam deflection. The deflection by 180° through two concave mirror surfaces partially eliminates any occurring imaging errors. The recording beam path for the image recording and the reverse beam path for the image projection are otherwise identical to each other whereby image distortions in the eye are substantially avoided.

However, in connection with spherical mirrors, remainder image faults occur due to their substantial imaging errors and in spite of the relatively small required deflection angles of smaller than ±10°. Therefore, high quality mirror systems such as concave parabolic mirrors and elliptical mirrors as defined in claim 5 are provided for the recording out of the eye and for projecting back into the eye.

According to the features of claim 6, an efficient reduction of imaging errors is achieved with the help of imaging on two concave glasses BG and BG' of a surface HS which is otherwise convex in the opposite direction. For this purpose it is possible to use the second half of the glasses of the spectacles as a full mirror surface BG' having the same concave curvature as the glasses BG.

According to the invention any type of biaxial image scanners can be used, for example rotating mirrors or polygonal mirrors for the line deflection and oscillating mirrors for the vertical deflection or acousto-optical deflection devices may be used for both axes.

In case a raster pattern scanning track is used with a separate horizontal and vertical deflection, the image assembly can be made to conform with conventional video standards such as VHS, NTSC, and HDTV.

It is, however, possible to also use other scanning track patterns which are better adapted to the image assembly of the eye than the raster scan. For example, a spiral scanning track may be used. The largest vision sharpness of the retina is found in the area of the so-called fovea centralis which takes up in the visual field only a small angular range of about ±2° around the axis of vision. When a person directs its attention to a fixed object, the eyes are normally moved in such a way that the beams emanating from the fixed object fall onto the fovea centralis.

The residence time of the scanning beam in a spiral image scanning pattern increases continuously in the direction toward the visual axis. Therefore, a spiral scanning pattern is substantially better adapted to the structure of the retina than a raster scanning pattern. Moreover, due to the increased duration of the residence time in the center, a correspondingly higher signal to noise ratio is achieved in the central area.

Thus, for the above reasons the invention provides for using a spiral scanning pattern instead of a raster scanning pattern. The two beam deflection units are respectively arranged and controlled for using a spiral scanning pattern.

The beam pass between the projection channel and the receiver or recording channel is separated with the aid of a switching mirror SUS as in a laser scanning ophthalmoscope. Due to the good focussing of the projection beam due to the small diameter of the laser beams, it is possible to select the diameter of the projection beam to be smaller than the diameter of the recording beam. Therefore, it is possible to use an aperture mirror for the separation of the two beam paths as shown in FIGS. 3 and 4. Due to the alternating use of the two beam paths it is possible to achieve a more efficient method by using a flip-flop mirror which switches the beam path synchronously with the scanning. The use of a flip-flop mirror has the advantages of smaller optical losses in the recording channel and of a better optical screen out of any direct "cross talk" between the projection channel and the recording (receiver) channel.

As shown in FIG. 3, a focussing device FE is positioned in the beam path of the laser projector unit upstream of the beam switch SUS for adjusting the size of the image spot projected by the laser beam onto the retina. FIG. 3 also shows a visual field aperture GFB in the receiver unit downstream of the beam switch SUS for varying the size of the scanning spot on the retina.

Figure 7:
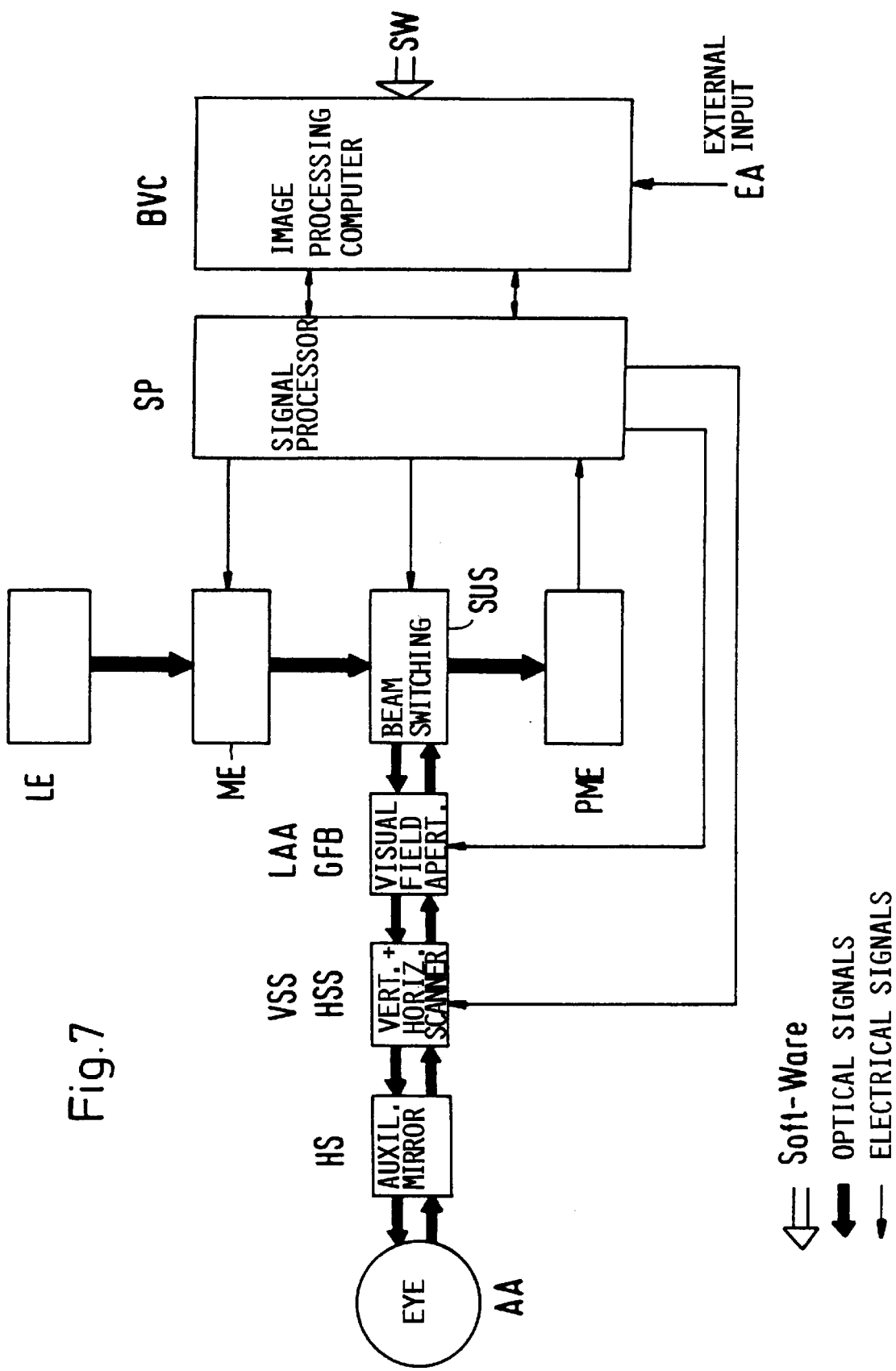
FIG. 7 is a schematic illustration of the optoelectronic and electronic subcomponents and their interconnections.

The visual field aperture GFB of claim 18 is positioned between two lenses and is provided in common for adjusting the momentary visual field "seen" by the photomultipliers. The adjustment of the visual field aperture GFB is necessary for adaptation to the illumination conditions at the retina and for adjusting the desired local resolution or definition. It is provided that both adjustments are accomplished automatically by controllers in response to computer control signals as shown in FIG. 7.

According to claim 12, it is provided that the retina reflex image is divided by the use of dichroic filters DFR, DFG and DFB and by three separate detectors PMR, PMG and PMB into up to three color channels, whereby a substantially true color image can be recorded. On the laser side dichroic beam splitters DS are also used for collimating in a common axis up to three laser beams in red, green and blue spectral range (LR, LG, LB) following a separate image modulation of each color MR, MG and MB.

For a true color image recording the optical signal is divided into three basic colors by dichroic filters DFR, DFG and DFB in the recording (receiver) channel to provide the three color components upstream of the three photosensors (receivers), preferably photomultipliers PMR, PMG and PMB. The three basic colors are separately measured. Due to the weak light signals primarily photon counting methods should be used.

The invention further provides that the electronic image recorded by the detector, is again converted, after image processing, into a serial optical image with the aid of laser beam sources and modulators. The converted image is then, in a second imaging cycle, projected back into the eye in synchronism with, but with a time lag relative to the scanning of the original retina reflex image. In the second imaging cycle the same optical components are used, however now functioning as laser deflection unit (laser scanner) after reflection at the inner surfaces of the spectacle glasses BG.

Figure 8:
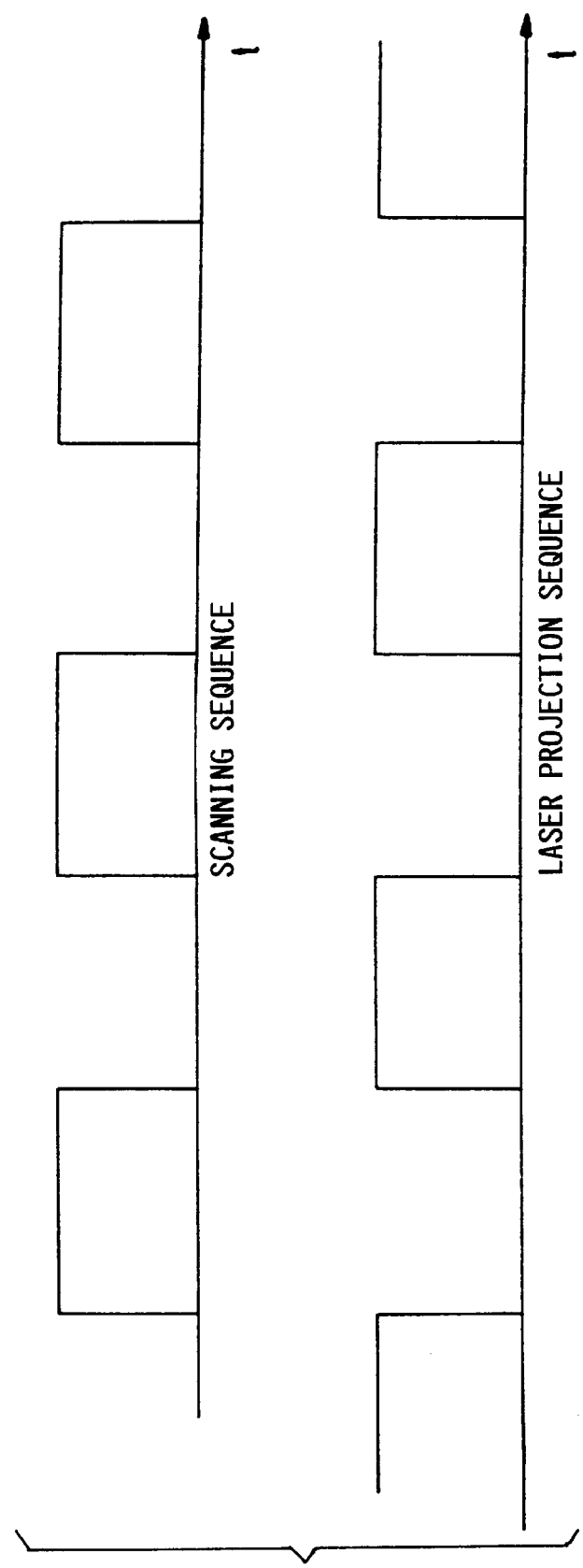
FIG. 8 shows schematically the waveforms of the timely scanning and laser projection sequences.

The invention suggests in claim 20 to separate in time the periods of image recording from the periods of image projection, i.e. to perform these alternatingly as shown in FIG. 8. In this manner, the recording of the weak retina reflex image of the exterior AW is not disturbed by the projection having a larger luminous intensity than the retina reflex image. For example, in a first image cycle the retina reflex image is recorded and in a second cycle the processed electronic image is projected into the eye. In a third cycle the retina reflex image is again recorded and in a fourth cycle the processed image is again projected back, and so forth.

When the image change takes place rapidly enough, the persistence of the eye makes sure that the two images appear for the viewer superimposed on one another, provided that the time lag of the picture projected into the eye is shorter than the motion duration and persistence time of the eye and that the stability and resolution of the projected image is comparable to the resolution of the eye.

The image repetition frequency must be sufficiently high in order to record the unconscious rapid, interrupted motion of the eye having a mean amplitude of 5 arc minutes and a duration between 10 and 20 ms and to record the rapid eye motions of 20° to 30° per second when the eye follows a moving object over a larger angular range. The recording is substantially adapted to the most rapid eye motions when a repetition frequency in the range of 50 Hz to 100 Hz is employed as is the case in the television and computer techniques. This adaptation applies for the raster scanning as well as for the spiral scanning.

Further technical requirements to be met by the recording device relate to the size of the visual field encompassed by the eye and to the image resolution of the present apparatus. For most applications the following visual field ranges are of interest. Namely, the area of highest definition vision having a diameter of 1° and about 7 million pixels in the fovea centralis of the retina and the neighboring area having a substantially lower definition up to about 10° diameter around the line of vision. The spiral scanning pattern for the recording track is especially suitable for satisfying these differing definition or resolution requirements.

Semiconductor lasers or miniaturized solid state lasers are provided as light sources for the projection of images back into the eye. These lasers have a low continuous wave power smaller than 300 µW which cannot cause any harm to the eye. In connection with the use of semiconductor lasers, the image modulation could be performed directly through the power supply for the lasers. In order to produce all colors, it is recommended that three lasers be used for the base colors red, green and blue. As shown by the known color triangle of the human vision, it is possible to generate all other colors including the non-colors gray and white by color summation of monochromatic laser lines of these base colors. The invention also includes the possibility of using any individual color in a monochromatic embodiment. As shown in FIG. 7, the invention provides a signal processor SP which processes electronically the direct image from the retina and which coordinates synchronously all functions of the apparatus, including the functions of the scanners VSS and HSS, of the laser spot adjustment and of the size of the viewing field aperture LAA/GFB. The image processing computer BVC receives the image or images observed by the eye from other technical sensors supplying their signals to an external terminal EA to the computer BVC which processes these images in accordance with a given program SW. Such processing taking place prior to modulating these images in the form of image signals onto the laser beams with the aid of the signal processor SP.

The laser projection makes it possible to superimpose synchroneously an exterior AW image onto the retina reflex image perceived by the eye. For this purpose the image processing computer BVC processes not only the perceived retina image for projection back into the eye for fading into the perceived image, but it also processes the exterior images which are supplied to the computer through a respective input EA. If the time duration between image recordal and projection is respectively short compared to the rapid eye movements, the eye will no longer perceive any image interruption, just as when watching a television screen.

The separate, but simultaneous image scanning from both eyes also records the perspective differences of both images. A reconstruction of the three-dimensional vision is assured because this three-dimensional vision is included in the laser return projection into both eyes.

In addition to the projection of the retina reflex images after image processing back into the eye, the apparatus according to claim 25 also makes possible the projection of these laser images directly onto the object seen by the eye in the exterior AW. This embodiment of the invention is shown schematically in FIG. 6 and is achieved by flipping the scanning mirror through an angle of 90°.

The structural elements used according to the invention are today substantially miniaturized and are available at reasonable costs. The beam deflection unit and the scanner can be installed in a simple spectacle frame B as shown in FIG. 9. By using a glass fiber conductor GFL it is possible to house the laser projector unit and the recording unit in a separate small housing TOE, for example having the size of a paperback book including a power supply battery. The data exchange with an external fixedly installed image processing computer can be accomplished either by a radio wave link or by an infrared radiation link. All elements of the apparatus according to the invention can thus, in the light of the state of the art, be carried by a person without trouble. Further, the wireless image data exchange with an external computer makes possible an unlimited freedom of motion.

The various areas of use of the invention can be summarized in the following four categories:

recording of images of the exterior AW, the processing and reverse projection for fading the back-projected image into the original image in the eye;

superimposing of images of other recording systems, for example of the same scene in other spectral ranges onto the original image;

superimposing of virtual images generated solely by the computer; and recording of images of the exterior AW and projecting these images not into the eye, but rather back onto the same objects that are seen by the eye in the exterior.

The first category involves applications with the aim of improving the image seen by the eye, by a purposeful image summation, for example to enhance the resolution and to amplify an unclear or weakly illuminated image which is of great help to people with normal vision as well as for people with a defective vision.

Other possibilities of modifying an image would, for example, involve the change of the color of objects by a new color summation. This technique could be used for a purposeful white coloring of certain areas within the vision field and thus to erase or reduce the optical information.

The second category involves the superposition of images of the same scene, for example taken in the infrared range (invisible) or seen by radar devices. This technique would substantially facilitate, for example, the driving of a vehicle or flying an aircraft at night and under foggy or hazy conditions.

For medical applications, it is possible to superimpose, for example X-ray images, acoustical images or images obtained by magnetic resonance tomography, onto the direct image of the patient's body or the patient's organs for facilitating the diagnosis made by the physician or for purposes of surgery.

The third category involves applications in which the image is enhanced by fading in virtual auxiliary images, e.g. when using the conventional HUD devices while driving a vehicle. The invention provides the additional advantage of an exact synchronization of the fading-in with the exterior image seen by the eye. In this manner it would be possible to fade-in extraneous images with small image content or as a stereo image at a different distance than the other objects.

Interactive applications from the computer technology belong into this third category, namely the fading-in of a virtual computer mouse (cross-hair) which can be guided alone by eye movements (instead by hand) over real objects in the exterior (also display). In this context, the initial click-on or an order could be performed by additional eye movements such as an eyelid flip or by voice or by pushing a button.

The third category also includes applications in cyberspace, i.e. the fading of virtual computer full images into the closed spectacles. According to the invention it is possible to use a recorded retina reflex image of the fade-in virtual images in order to stabilize these images relative to eye movements.

The fourth category describes a type of "active viewing", i.e. a scene seen by the eye and recorded by the scanner is serially illuminated in the next scanning cycle by a laser image spotlight or projector. The thus illuminated scene is again recorded by the eye and leads in the next following cycle to a changed second laser illumination which is followed by a third cycle and so forth. In this manner an optical feedback loop is generated which, depending on the respective arrangement of the illumination, can either be used as a positive feedback or a negative feedback for the various applications, for example in order to brighten objects that are hard to recognize or to increase their contrast, or to change their color.

What is claimed is:

1. An apparatus for recording a retina (NH) reflex image of the exterior as perceived by the human eye, comprising an optical transmitter/reflector for transmitting rays of an exterior image into the human eye and for reflecting said retina reflex image, an optoelectronic receiver/detector for serially recording said retina reflex image, wherein said optical transmitter/reflector comprises a beam splitter mirror or a controllable mirror (BG) having a vaulted eye facing surface, said apparatus further comprising a biaxial scanner (HSS; VSS) positioned for scanning said retina (NH) reflex image as reflected by said beam splitter mirror, said biaxial scanner deflecting said retina reflex image along a reflex image beam path to said optoelectronic receiver/detector for said serial recording of said retina reflex image.

2. The apparatus of claim 1, further comprising a laser beam projector for projecting and superimposing a laser image onto said retina reflex image.

3. The apparatus of claim 2, further comprising an image processor for processing said retina reflex image to produce a modified image, and wherein said laser beam projector projects said modified image back into said human eye.

4. The apparatus of claim 2, further comprising an image input device for providing to said laser beam projector further images for projection by said laser beam projector into said human eye by laser beams.

5. The apparatus of claim 2, further comprising a laser beam path deflector for deflecting a laser beam of said laser beam reflector onto objects seen by said human eye.

6. The apparatus of claim 2, further comprising image modulators positioned in a beam path of said laser beam projector for generating on said retina (NH) said laser image synchronously with said scanning of said retina reflex image but with a time lag to said scanning.

7. The apparatus of claim 2, further comprising a device (SUS) positioned in a reflex image beam path of said retina reflex image, for projecting said laser image back into said eye along said reflex image beam path, but in the opposite direction relative to the direction of said retina reflex image.

8. The apparatus of claim 2, further comprising an illumination channel, and beam splitters in said illumination channel for collimating a plurality of laser beams into said reflex image beam path for projection onto said retina (NH).

9. The apparatus of claim 2, further comprising a flexible fiber optical conductor (GFL) for coupling said optoelectronic receiver detector and/or said laser beam projector to said biaxial scanner (HSS, VSS).

10. The apparatus of claim 2, further comprising a beam focussing device positioned for focussing said laser beam of said laser beam projector for varying the size of an image spot of said laser image on said retina (NH).

11. The apparatus of claim 1, further comprising an image processor computer (BVC) for processing said retina reflex image in synchronism with said scanning of said retina reflex image, said image processor computer (BVC) being further capable of synchronizing extraneous images with said retina reflex images or of synchronizing computer processed informations with said retina reflex images.

12. The apparatus of claim 1, further comprising in said reflex image beam path forming an optical receiver channel, a plurality of beam splitters (DS) and a respective plurality of photodetectors (PMR, PMG, PMB) for detecting a plurality of spectral ranges independently of each other.

13. The apparatus of claim 1, further comprising spectacles, and wherein said apparatus is arranged in said spectacles.

14. The apparatus of claim 13, wherein said spectacles comprises glasses forming said beam splitter mirror (BG).

15. The apparatus of claim 1, further comprising a variable visual field aperture (GFB) in said reflex image beam path of said optoelectronic receiver/detector for varying the size of a scanning spot on said retina (NH).

16. A method for recording a retina (NH) reflex image of the exterior as perceived by the human eye (AA), comprising the following steps:

(a) scanning said retina reflex image from said retina (NH) to provide a scanned image, (b) deflecting said scanned image into an optoelectronic receiver/detector, and (c) serially recording said scanned image to provide a recorded scanned image.

17. The method of claim 16, further comprising (d) projecting said recorded scanned image or an extraneous image back into said human eye (AA), and (e) synchronously superimposing said scanned image or said extraneous image onto said retina reflex image, whereby said scanned image may be a modified image or an enhanced image.

18. The method of claim 17, further comprising alternating in time said scanning step and said projecting step so that a sequence of scanning steps fits into time slots between projecting steps in a sequence of projecting steps and vice versa.

19. The method of claim 16, wherein said scanning step (a) is performed along a raster scanning pattern or a spiral scanning pattern.

20. The method of claim 16, further comprising modifying or enhancing said retina reflex image by any one or more of the following image processing steps: image summation, color variation or modification, superimposing of images of the same scene, but taken in spectral ranges outside the visible range, and fading-in virtual images.

21. The method of claim 20, comprising fading-in a virtual computer mouse, and guiding said virtual computer mouse solely by eye movements for performing instructions in response to said eye movements.

22. The method of claim 20, further comprising fading-in virtual computer generated images and using the virtual computer image received by said retina for stabilizing said virtual computer images.

23. The method of claim 16, further comprising serially illuminating by a laser image spotlight a scene seen by said eye and recorded on said retina (NH).

* * * * *